Aug. 15, 1939.　　H. V. SCHWEITZER　　2,169,772
CONVEYER
Original Filed Nov. 11, 1935
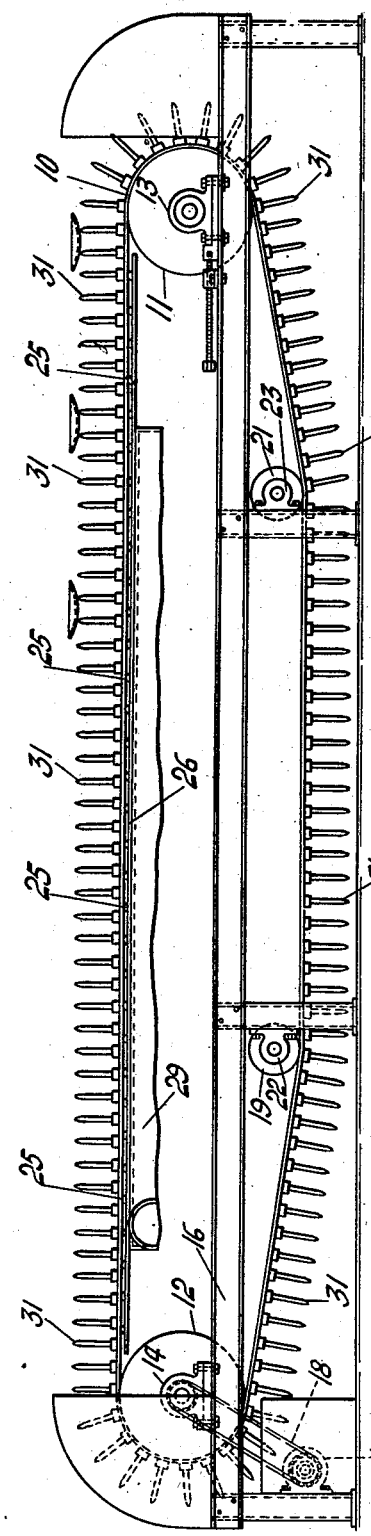
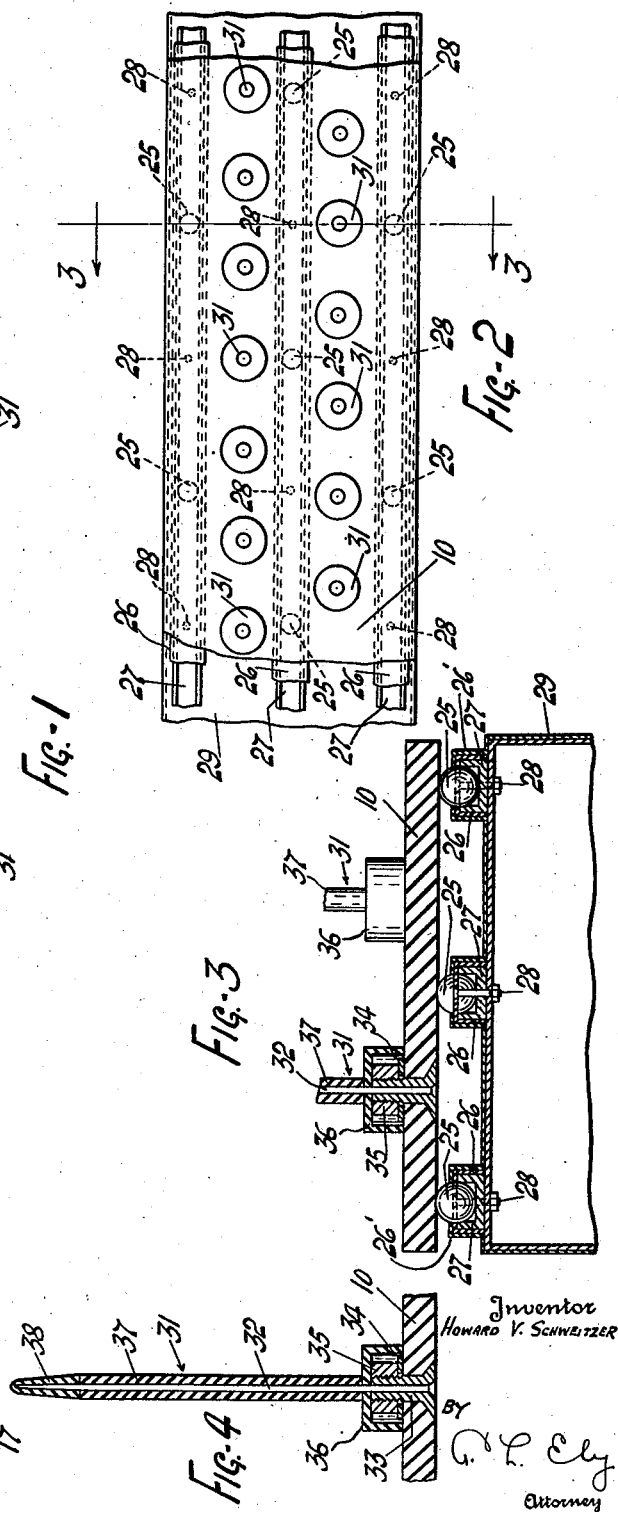
Inventor
HOWARD V. SCHWEITZER
BY
Attorney Patented Aug. 15, 1939

2,169,772

UNITED STATES PATENT OFFICE 2,169,772

CONVEYER

Howard V. Schweitzer, Cleveland, Ohio

Original application November 11, 1935, Serial No. 49,167. Divided and this application July 3, 1936, Serial No. 88,795

10 Claims. (Cl. 198—131)

This invention relates to means for conveying frangible articles, such as vitreous and semi-vitreous ware and other articles of ceramic materials. Ware which has been fired, but not glazed, is known as bisque ware. It is necessary to clean each piece of this bisque ware before the glaze is applied. The subject matter of this application has been divided out of my copending application Serial No. 49,167 filed November 11, 1935, wherein apparatus for cleaning bisque ware is fully disclosed and claimed. The purposes of this invention are to provide for conveying articles, such as bisque ware, and for adequately supporting the articles in a manner which exposes the surfaces thereof so that substantially all of these surfaces may be treated effectively and thoroughly in one operation, which may be performed as a part of a continuous process. For example, this invention provides conveying means for transporting the ware while it is being cleaned, as disclosed in said copending application.

Other important objects of the invention are to provide for smooth running and elimination of shocks so as to avoid breakage and shifting of the ware out of its proper position during treatment; and also to provide apparatus of this class having an improved construction and relative arrangement of parts.

Apparatus embodying the features of the invention is illustrated in the accompanying drawing, wherein:

Fig. 1 is a side elevation of a conveyer;

Fig. 2 is an enlarged plan view of a portion of the conveyer;

Fig. 3 is an enlarged section on the line 3—3 of Fig. 2, illustrating the supporting means for the upper run of the conveyer; and Fig. 4 is an enlarged section through one of the pins carried by the conveyer.

The preferred embodiment of the invention selected for illustration comprises a travelling conveyer 10 in the form of an endless belt of flexible, yieldable material, preferably rubber belting such as elastic rubber reinforced with fabric. This conveyer operates over an idler pulley 11 and over a driven pulley 12. These pulleys are rotatably mounted in bearings 13 and 14 and similar bearings (not shown) carried by the main frame 16. Power for operating the conveyer is transmitted from a suitable source, such as a combined motor and reduction unit 17, through a chain drive 18 to the driven pulley 12. The unit 17 may conveniently be mounted on the main frame. The lower run of the conveyer passes over idler pulleys 19 and 21 mounted in bearings 22 and 23 and similar bearings (not shown) carried by the main frame.

Means are provided for supporting the upper run of the conveyer to maintain this run substantially level and to assure smooth and easy operation free from shocks or other disturbances. As shown in Figs. 1 and 3, this run may be supported on rows of smooth, highly finished convex surfaces provided by balls 25 preferably of glass, although good results may be obtained with similar surfaces formed of highly finished steel or with some of the harder alloys or steels for special purposes. Preferably these balls do not rotate but are held stationary in longitudinal rows. The means for holding the balls in position comprise upper and lower strips 26 and 27 of channel section with their flanges overlapping. The upper strips 26 have holes slightly smaller in diameter than the balls which project through these holes and are held fixed in position when the strips 26 and 27 are drawn together by attaching elements, such as the bolts 28, which also secure these strips to suitable supporting means, such as the member 29. Preferably, as shown in Fig. 1, these strips extend substantially to the pulleys 11 and 12 so that practically the entire upper run of the conveyer is adequately supported and assured of smooth and easy operation and of being maintained substantially level. It will be evident that the upper run of the conveyer rides only on the spherical or convex surfaces of these balls. Preferably the upper ball retaining strips 26 are covered with rubber indicated at 26'.

The conveyer is provided with two rows of upright slender elements or pins 31, the pins of one row preferably being staggered with respect to those in the other row. As shown in Fig. 4, each pin comprises a shank portion 32 which is affixed to a threaded head 33, as by means of solder. The threaded portion of the head extends through the conveyer and receives a washer 34 and a nut 35 by means of which the pin is clamped securely in an upright position. A rubber cap 36 fits over the nut and washer and has an aperture through which the shank 32 extends. A rubber tube 37 fits over the shank. The upper end of the pin tapers to a point and this tapering portion is covered by a conical rubber tip or cap 38. It will be seen that each pin and all metal parts or attachments thereof are fully covered with elastic rubber. When the conveyer is used for carrying bisque ware through the field of action of impacting devices, such as sand blast guns, as disclosed in my copending application previously identified herein, it will be evident that the rubber covering of the pins makes it practical to use pins of comparatively soft and inexpensive metal which otherwise would be rapidly worn away. However, when used under other conditions, such that the pins are not subjected to an abrading or similar action, the rubber covering may be omitted.

In using this apparatus the conveyer is set in motion so that its upper run travels from right to left as viewed in Fig. 1. Articles to be treated, such as pieces of unglazed vitreous or semi-vitreous ware, may be delivered to the pins mechanically or manually. Each article resting on the pointed ends of the pins is subjected to the desired treatment as it passes along the upper horizontal run of the conveyer. It will be noted that the pins provide, in effect, a travelling bed of points spaced from each other for adequately supporting ceramic articles, such as dishes. These supporting points or upper ends of the pins are spaced sufficiently from the conveyer belt 10 to expose the lower surfaces of dishes resting thereon to the action of spraying devices or sand blast guns, which may be directed inwardly and upwardly along the horizontal run of the conveyer. The relative motion produced by the travel of the conveyer causes such devices, in effect, to swing partly around each pin so that the lower surface of a dish so supported is effectively covered. The staggered spacing arrangement of the pins affords adequate support and also cooperates to make the lower surfaces of the dishes accessible for treatment. The conveyer belt 10, of fabric and elastic rubber, passes smoothly over the convex surfaces of the glass balls 25, and tends to cushion and to dampen out shocks or jars, thereby protecting frangible articles resting on the pins from breakage or other damage resulting from unnecessary disturbances which might cause the articles to shift either to a position of unbalance from which they would fall off the conveyer, or to a position in which they might be knocked off by some stationary object adjacent the conveyer. It will be evident that after the articles have been subjected to the desired treatment they may be removed from the pins manually or mechanically.

While the preferred form of the invention and the best mode of applying the principles thereof have been disclosed herein, it will be understood that various modifications will occur to those skilled in the art when informed by this specification and that the invention is not limited except as indicated by the appended claims.

What is claimed is:

1. The combination of a travelling conveyer of yieldable, flexible material, supporting means for said conveyer comprising spherical elements spaced transversely and longitudinally thereof, and slender elements carried by the conveyer, said elements extending from the conveyer and providing supporting points spaced apart and from the conveyer for supporting articles of ceramic materials so that substantially the entire surfaces of articles resting on said points are substantially unobstructed by the conveyer and by said elements and are accessible for treatment while the conveyer is in motion.

2. The combination of a travelling conveyer of yieldable, flexible material, supporting means for said conveyer comprising smooth, highly finished convex surfaces engaging the under side thereof, and slender elements carried by the conveyer, said elements extending from the conveyer and providing supporting points spaced apart and from the conveyer for supporting articles of ceramic materials so that substantially the entire surfaces of articles resting on said points are substantially unobstructed by the conveyer and by said elements and are accessible for treatment while the conveyer is in motion.

3. The combination of a travelling conveyer of yieldable, flexible material, supporting means for said conveyer comprising glass balls spaced longitudinally and transversely of the conveyer and engaging the under side thereof, means for retaining said balls in their spaced relationship, and slender elements carried by the conveyer, said elements extending from the conveyer and providing supporting points spaced apart and from the conveyer for supporting articles of ceramic materials so that substantially the entire surfaces of articles resting on said points are substantially unobstructed by the conveyer and by said elements and are accessible for treatment while the conveyer is in motion.

4. The combination of a travelling conveyer having an approximately horizontal run, substantially upright elements carried by the conveyer for supporting ceramic articles, and supporting means for said run adapted to provide for smooth, substantially uniform motion of the conveyer, said supporting means comprising substantially spherical elements, spacing means for said spherical elements comprising members having holes, each of said holes receiving and fitting about one of said spherical elements so that the latter projects from said spacing means, thereby providing convex surfaces engaging the approximately horizontal run of the conveyer.

5. The combination of a travelling conveyer having an approximately horizontal run, substantially upright elements carried by the conveyer for supporting ceramic articles, and supporting means for said run adapted to provide for smooth, substantially uniform motion of the conveyer, said supporting means comprising substantially spherical elements, channels fitting over said spherical elements and having holes through which said spherical elements project, thereby providing convex surfaces engaging the approximately horizontal run of said conveyer.

6. The combination of a travelling conveyer having an approximately horizontal run, substantially upright elements carried by the conveyer for supporting ceramic articles, and supporting means for said run adapted to provide for smooth, substantially uniform motion of the conveyer, said supporting means comprising substantially spherical elements, spacing means for said spherical elements comprising members having holes of less diameter than said spherical elements and receiving the latter so that the convex surfaces projecting from said holes engage the approximately horizontal run of said conveyer, and means for holding said spherical elements firmly in said holes so that said spherical elements remain substantially fixed.

7. In a conveyer of the class described, a relatively thin flexible web travelling in a substantially horizontal plane, a plurality of transversely and longitudinally spaced pins extending through said web, points on one end of said pins defining an article supporting plane at a substantial elevation above said web, heads on the other end of said pins countersunk in the lower surface of said web, and nuts threaded on said pins and engaging the upper surface of said web to secure said pins thereto.

8. In a conveyer for ceramic articles, the combination of a flexible travelling web and long article supporting pins secured to said web and extending upwardly therefrom, said pins being spaced with respect to each other to define an elevated article supporting plane, the height of said pins being not less than one-fifth of the width of said web to permit the upper and lower surfaces of articles resting on said pins to be subjected to simultaneous treatment.

9. In a conveyer of the class described, a travelling web and a plurality of upstanding pins secured to said web to support articles to be conveyed at a substantial elevation above said web, said pins being spaced with respect to each other to define an article supporting plane, the height of said pin being substantially two-thirds of the width of said web to permit the lower surfaces of articles conveyed to be subjected to treatment.

10. In a conveyer of the class described, the combination of a flexible travelling web, means for supporting said web comprising a plurality of spaced members engaging the under surface of said web, and a plurality of slender article supporting pins secured to said web and extending upwardly therefrom, the height of said article supporting pins being not less than one-fifth of the width of said web so that the upper and lower surfaces of articles supported by said pins may be subjected to simultaneous treatment.

HOWARD V. SCHWEITZER.